United States Patent [19]

Stuyvenberg

[11] Patent Number: 4,866,358
[45] Date of Patent: Sep. 12, 1989

[54] MOTOR CONTROL CIRCUIT WITH VIBRATION DETECTOR

[76] Inventor: Bernard Stuyvenberg, 30733 Clark, New Haven, Mich. 48048

[21] Appl. No.: 170,995

[22] Filed: Mar. 21, 1988

[51] Int. Cl.⁴ ............................................. B23Q 5/00
[52] U.S. Cl. ..................................... 318/460; 318/39
[58] Field of Search ................. 318/39, 460, 480, 571

[56] References Cited

U.S. PATENT DOCUMENTS

| | | | |
|---|---|---|---|
| 2,240,822 | 5/1941 | Adams | 318/39 X |
| 2,381,505 | 8/1945 | Lindholm | 318/480 X |
| 2,491,466 | 12/1949 | Adams | 318/460 X |
| 2,766,939 | 10/1956 | Weston | 318/39 X |
| 3,095,532 | 6/1963 | Floyd | 318/460 |
| 3,223,964 | 12/1965 | Stadlin | 318/460 X |
| 3,305,765 | 2/1967 | Rittner | 318/39 X |
| 3,459,378 | 8/1969 | Hill | 318/39 X |
| 3,904,857 | 9/1975 | Sandblom | 318/39 X |
| 4,096,424 | 6/1976 | Hysler | 318/39 X |
| 4,137,487 | 1/1979 | Niestroj et al. | 318/39 |

FOREIGN PATENT DOCUMENTS

| | | | |
|---|---|---|---|
| 1194647 | 6/1965 | Fed. Rep. of Germany | 318/460 |
| 0591825 | 2/1978 | U.S.S.R. | 318/460 |

Primary Examiner—Bentsu Ro
Attorney, Agent, or Firm—Gifford, Groh, Sheridan, Sprinkle and Dolgorukov

[57] ABSTRACT

A motor control circuit for a machine, such as a granulator, having an intake adapted to receive parts to be machined. The motor control circuit detects the introduction of parts into the machine intake and automatically activates the motor for a predetermined period of time. Thereafter, the motor control circuit detects the presence of a machining operation through a vibration or sound transducer. In the absence of an output from the vibration or sound transducer, indicative that the machining operation has been completed, the motor control circuit deactivates the motor.

13 Claims, 2 Drawing Sheets

MOTOR CONTROL CIRCUIT WITH VIBRATION DETECTOR

BACKGROUND OF THE INVENTION

I. Field of the Invention

The present invention relates to an auxiliary motor control circuit for machine which performs a machining operation on parts.

II. Description of the Prior Art

In plastic injection molding operations, a portion of the molten injected plastic remains in the supply passageways in the mold and solidifies along with the desired injected part. This wasted material is conventionally recycled by remelting and reinjecting the material into the mold. However, prior to remelting and recycling this material, the material must be ground or granulated into small pieces.

Granulators are typically used to chop or granulate the waste material so that it can be recycled. Such granulators comprise an intake into which the waste material is inserted. The intake is spaced from but open to granulator blades which are rotatably driven by a motor and, when driven, the waste material is granulated as desired.

In a typical industrial environment the granulator motor is continually left on during the entire work shift in order to eliminate the necessity for the workman to turn on the granulator motor whenever granulation of the waste material is desired. Although this practice does simplify the job for the workman, it disadvantageously wastes electrical power since the granulator granulates or machines waste material during only a fraction of time during the work shift.

SUMMARY OF THE PRESENT INVENTION

The present invention provides an auxiliary motor control circuit for a granulator or the like which overcomes all of the above mentioned disadvantages of the previously known devices.

In brief, the auxiliary motor control circuit of the present invention comprises means for detecting the introduction of parts into the intake of the machine. A flap is typically disposed across the intake of the machine which is moved whenever waste material or parts are introduced into the intake. Preferably, a lever is attached to the flap and forms part of a position or movement transducer which generates an output signal whenever the flap is moved. The auxiliary motor control circuit activates the motor for a predetermined period of time whenever the lever or flap is moved.

A vibration transducer in the auxiliary motor control circuit generates an output signal proportional to the vibration of the machine. Machine vibration greater than a threshold amount is indicative that parts are currently being machined or granulated by the granulator. Conversely, an output signal from the vibration transducer less than the threshold amount is indicative that no parts are being granulated even though the motor is activated.

Following activation of the motor after movement of the lever, the auxiliary motor control circuit senses the continued presence of the machining operation through the vibration transducer. The auxiliary motor control circuit maintains activation of the motor as long as the signal from the vibration transducer exceeds the threshold level; otherwise, the auxiliary motor control circuit deactivates the motor until a subsequent movement signal is again received from the lever.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE INVENTION

Figure 1:
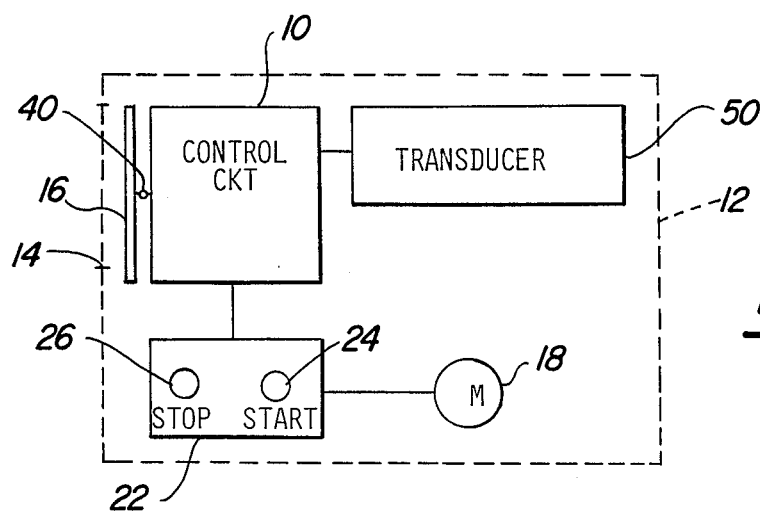
FIG. 1 is a diagrammatic view of a preferred embodiment of the present invention installed on a granulator.

With reference first to FIG. 1, a preferred embodiment of the auxiliary motor control circuit 10 of the present invention is thereshown for use with a granulator 12. In the conventional fashion, the granulator 12 comprises an intake 14 into which parts (not shown) to be machined or granulated are introduced. A flap 16 is disposed across the intake 14 which moves whenever parts are introduced into the intake 14.

Figure 2:
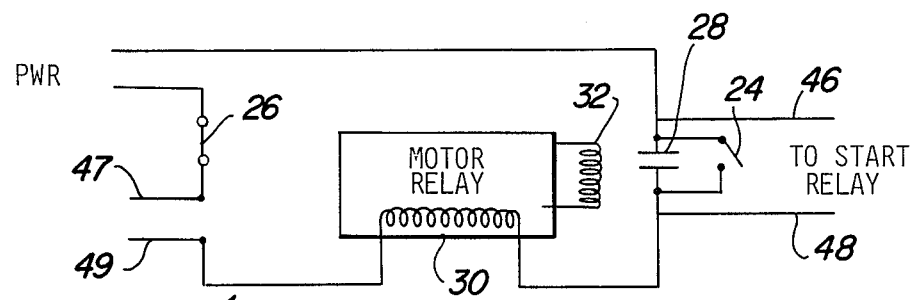
FIG. 2 is a schematic view illustrating a portion of the preferred embodiment of the present invention.

Referring now to FIGS. 1 and 2, the granulator 12 also includes a motor 18 (FIG. 1) which, when activated, granulates the parts. A conventional motor circuit 22 having a normally open START switch 24 and a normally closed STOP switch 26 controls the activation of the motor 18. As best shown in FIG. 2 and assuming a short circuit between nodes A and B, the start switch 24 for the motor circuit 22, upon closure, short circuits the relay contacts 28 and energizes the motor relay 30 which, when energized, supplies power to the motor 18. The motor relay 30 also simultaneously energizes a coil 32 to close contacts 28. Since the contacts 28 are held in a closed condition by the coil 32 even though the start switch 24 is subsequently opened, the motor relay 30 remains energized and the motor 18 remains activated.

The STOP switch 26 is normally closed and is wired in series with the power supply to the motor relay 30. Upon actuation or opening of the STOP switch 26, the electrical power to the motor relay 30 is interrupted which deenergizes the motor relay 30 and deactivates the motor 18.

Figure 3:
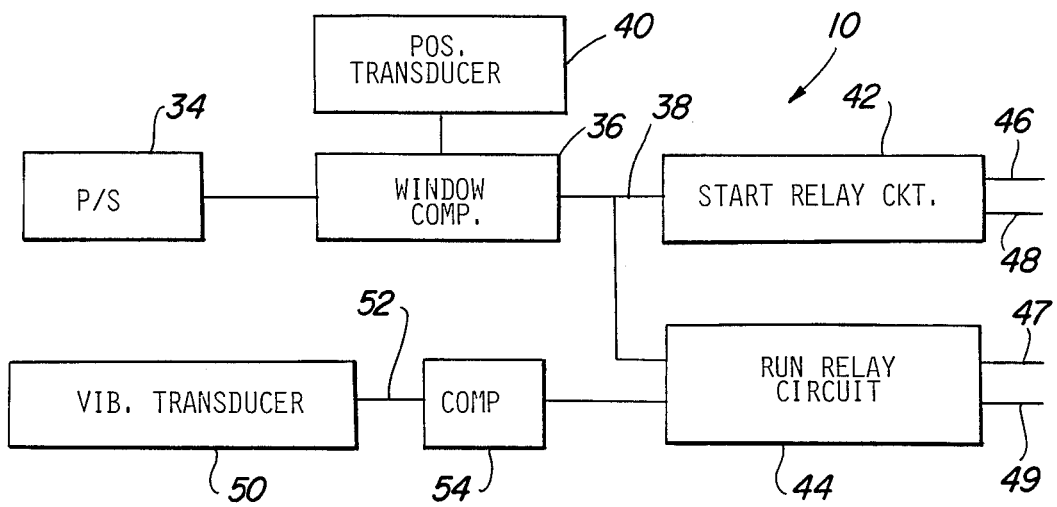
FIG. 3 is a block schematic view of a portion of the circuitry of the preferred embodiment of the present invention.

The auxiliary motor control circuit 10 of the present invention operates in tandem with the motor circuit 22 on the granulator 12 to control activation of the motor 18. With reference now to FIG. 3, a preferred embodiment of the auxiliary motor control circuit 10 of the present invention is thereshown and comprises a power supply 34 which provides power to the auxiliary motor control circuit 10.

The power supply 34 powers a window comparator circuit 36 which receives a signal from a movement transducer 40 whenever parts are introduced into the intake 14 of the granulator 12. The operation of the window comparator circuit 36 will be subsequently described in greater detail. However in brief, the window comparator circuit 36 generates a signal on its output 38 whenever parts are introduced into the intake 14 and thus whenever a signal is received from the movement transducer 40.

With reference to FIGS. 2 and 3, the output signal from the window comparator circuit 36 simultaneously activates a start relay circuit 42 and a run relay circuit 44. The start relay circuit 42, in response to a signal from a signal on output 38, electrically connects or short circuits lines 46 and 48 (see FIG. 2). This starts the motor 18 by short circuiting the relay contacts 28 in the same fashion as the closure of the start switch 24 which has been previously described.

Still referring to FIGS. 2 and 3, the output 38 from the window comparator circuit 36 is also connected to the run relay circuit 44. The run relay circuit 44, upon receipt of the signal from the window comparator output 38, provides a closed or short circuit for lines 47 and 49 (FIG. 2) which are connected to the nodes A and B and thus are connected in series with the STOP switch 26. (The lines 47 and 49 replace the conventional short circuit connection between nodes A and B present in the conventional motor circuit 22.) Consequently, upon receipt of the signal on output line 38 from the window comparator 36, the auxiliary motor control circuit 10 activates the electric motor 18 for the granulator. Furthermore, as will subsequently be described in greater detail, the window comparator 36 provides an output signal on its output 38 whenever the flap 16 (FIG. 1) is moved as would occur when parts are introduced into the intake 14 of the granulator 12.

Referring now particularly to FIG. 3, a vibration transducer 50 has its output 52 connected through an amplifier 54 to the run relay circuit 44. Whenever the transducer 50 detects a vibration greater than a predetermined threshold, indicative that a machining or granulating operation is presently taking place, the transducer 50 and amplifier 54 provide an output signal to the run relay circuit 44. This output signal maintains the electrical connection between the electrical lines 47 and 49 and thus maintains continued activation of the electric motor 18. Conversely, when the vibrations detected by the vibration transducer 50 fall below the predetermined threshold, the run relay circuit 44 is deactivated thus electrically opening lines 47 and 49, deenergizing the motor relay 30 and, simultaneously, the motor 18.

In operation, the flap 16 moves each time parts are introduced into the granulator intake 14. This movement is transmitted as an input signal to the window comparator circuit 36 which, in turn, generates an output signal to both the start relay circuit 42 and the run relay circuit 44. In the previously described manner, a signal on the window comparator output 38 activates both the start relay circuit 42 and the run relay circuit 44 to turn on the granulator motor 18 for a predetermined time period.

Following the predetermined time period, the output 52 from the vibration transducer 50 determines the duration of the activation of the motor 18. More specifically, in the event that the vibration transducer 50 detects a vibration greater than a predetermined threshold, indicative that a granulating operation is presently taking place, the vibration transducer 50 activates the circuit 44 and maintains the motor relay 30 energized. Conversely, when the output from the vibration transducer 50 falls below a predetermined amount, indicative that parts are not being granulated even though the motor 18 is activated, the run relay circuit 44 is deactivated which electrically opens lines 47 and 49 and deenergizes the motor relay 30.

As will be subsequently described in greater detail, the window comparator circuit 36 generates a signal on its output 38 whenever the flap 16, and thus the position transducer 40, is moved regardless of the original position of the flap 16. Thus, a signal on line 38 is generated if the flap is moved from a partway open position, as might occur if the operator stacks parts at the intake 14 so that the parts keep the flap 16 in a partially open position. In this event, the granulator would be initially activated for the predetermined time period. However, since the parts were not actually fully introduced into the granulator, the motor would be deactivated in the previously described fashion. Thereafter, when the parts are actually pushed into the granulator, the flap 16 again moves so that the window comparator circuit 36 generates a signal on its output 38 to activate the motor 18.

Figure 4:
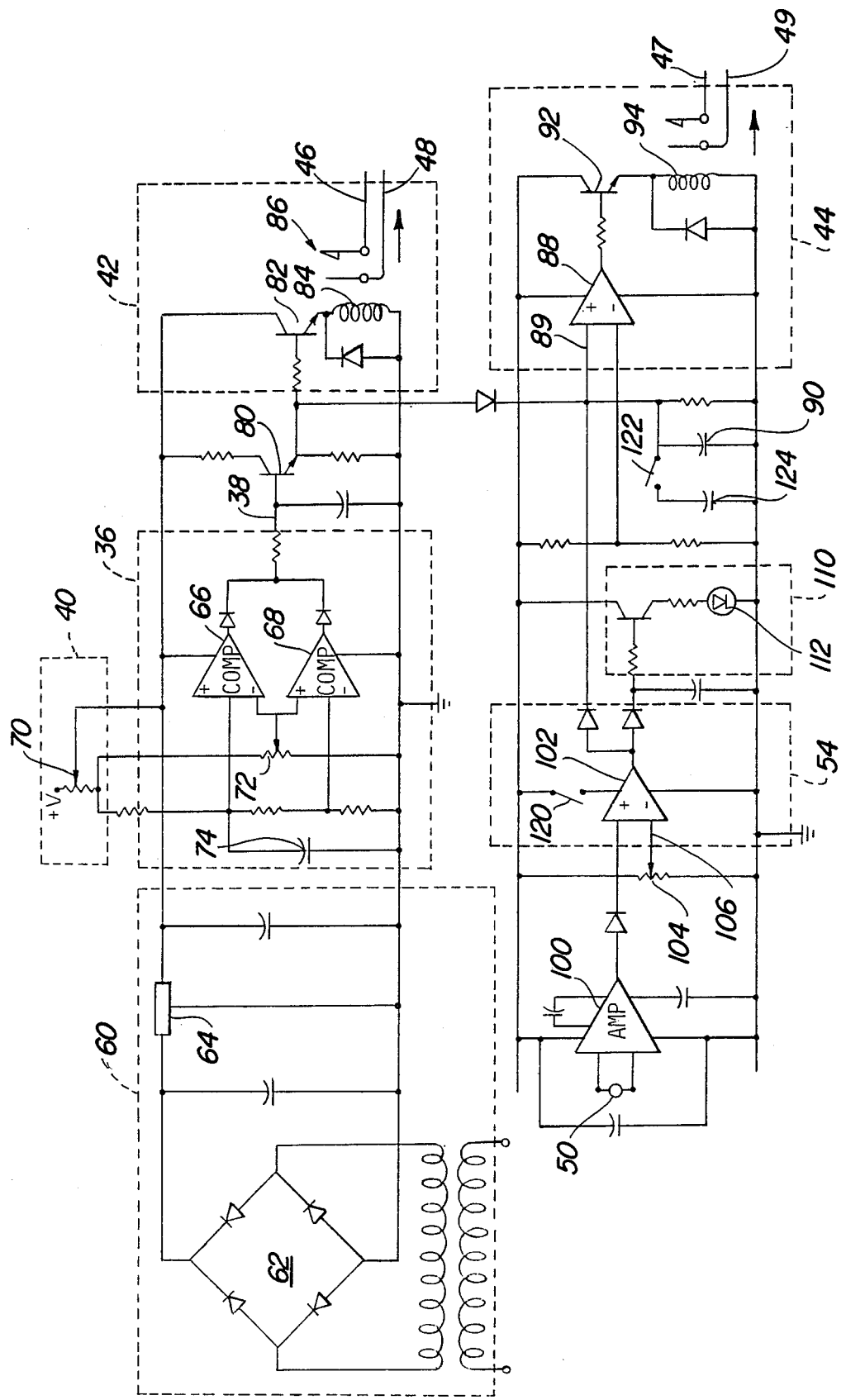
FIG. 4 is a schematic view of another portion of the circuitry of the preferred embodiment of the present invention.

With reference now to FIG. 4, a preferred embodiment of the circuit for the auxiliary motor control 10 is thereshown. The circuit 10 includes a power supply 60 which powers the entire circuit 10. The power supply 60 is conventional in construction and comprises a rectifier bridge 62 which, through a voltage regulator 64, provides regulated DC voltage from an AC power source.

Still referring to FIG. 4, the window comparator 36 includes two comparators 66 and 68 which have their outputs connected to form the comparator output 38. A variable resistor 70 is coupled to the movement transducer 40 so that movement of the transducer 40 varies the resistance of the resistor 70.

One end of the resistor 70 is coupled to a preset voltage V while the other end of the resistor 70 is connected through a variable calibration resistor 72 to ground. The arm or wiper of the variable resistor 72 is connected to both the negative input of the comparator 66 and the positive input of the comparator 68. Thus, movement of the flap 16 (FIG. 1) simultaneously varies the resistance of the resistor 70 which instantaneously varies the voltage to the negative and positive inputs of the comparators 66 and 68, respectively.

The resistor 70 is also coupled through a limiting resistor and voltage divider resistors to the other inputs of the comparators 66 and 68. Additionally, a charging capacitor 74 is electrically connected between the positive input of the comparator 66 and ground as well as to the negative input of the comparator 68 through a voltage divided resistor. Due to the capacitor 74, the voltage provided to the positive input of the comparator 66 and the negative input of the comparator 68 is a function of the position of the variable resistor 70 but also includes a time delay dependent upon the charging time for the capacitor 74.

The positive and negative inputs of the comparator 66 and 68, in effect, form a voltage window which monitor the voltage level at the negative and positive inputs of the comparators 66 and 68, respectively. Whenever this latter voltage, representative of the instantaneous position of the variable resistor 70, exceeds the voltage level of the positive input to the comparator 66, or falls below the negative voltage input of the comparator 68, the comparator 66 or 68 generates an output pulse on output line 38.

The actual range of the voltage window for the comparator 66 or 68, however, varies or shifts up and down as a result of the position of the potentiometer 70. Thus, a different voltage window would be applicable in the event that the flap 16 (FIG. 1) is held in a partially open position than if the flap 16 were fully closed. In either event, however, an output pulse is generated on line 38 whenever the flap 16, and thus the position transducer 40, is moved from a rest position.

Other means, e.g. infrared motion detectors or photo detectors, can alternatively be employed for detecting the introduction of parts into the granulator intake 14.

Still referring to FIG. 4, an output pulse on line 38 turns on a first transistor 80 which then turns on a second transistor 82. The second transistor 82 is connected to the coil 84 of a relay 86 which, when energized, electrically connects the lines 46 and 48 together (see also FIG. 2) and bypasses the contactor 28.

The output from the transistor 80 is also connected to one input 89 of a comparator 88 as well as a capacitor 90. The capacitor 90 charges which turns on and keeps on the comparator 88 for a predetermined time period dependent on the discharge time of the capacitor 90. The comparator 88, when on, turns on a transistor 92 and energizes a relay coil 94. Energization of the relay coil 94 closes the relay and electrically connects lines 47 and 49 together (see also FIG. 2) to thus energize the motor relay 30.

Still referring to FIG. 4, the vibration transducer 50 has its outputs connected through an amplifier 100 and amplifies the signal from the transducer 50 and provides an output signal to one input 101 of a comparator 102. The comparator 102 generates a signal on its output whenever the signal on its input 101 exceeds the signal on its second input 106.

The output of the comparator 102 is connected to the first input 89 of the comparator 88, i.e. the same input 89 of the comparator 88 that the output from transistor 80 is connected. Thus, in the event that the vibration transducer 50 receives vibrations in excess of a predetermined amount, indicative that parts are being granulated by the machine, the transducer 50 provides an output which, through amplifier 100 and comparator 102, turns on the comparator 88. When the comparator 88 is turned on, the transistor 92 conducts which energizes the coil 94 and closes the lines 47 and 49 in the previously described fashion.

Conversely, when the output from the vibration transducer 50 falls below a predetermined amount, indicative that no parts are being machined or granulated, the output from the amplifier 100 to the input 101 of the comparator 102 falls below a user selected level on its second input 106. When this happens, the comparator 102 turns off the comparator 88 which deactivates the transistor 92, deenergizes the coil 94 and, through lines 47 and 49, deenergizes the motor relay 30 and turns off the motor 18. The threshold level which determines the switching point of the comparator 102 is set by the user through a trimmer resistor 104.

A light indicator is preferably connected to the output of the comparator 102 to indicate, through an LED 112, the presence of an output signal from the comparator 102. This LED 112 is also used to set the threshold limit for the vibration transducer through the trimmer resistor 104.

In operation, movement of the position transducer 40 produces an output signal on line 38 which energizes the motor relay 30 (FIG. 2) in the previously described fashion. Simultaneously, however, the capacitor 90 is charged by the output from the transistor 80 so that the comparator 88 generates an output signal for a predetermined time period as determined by the charging constant or value of the capacitor 90.

Thereafter, the signal from the vibration transducer 50 turns on the comparator 102, which also turns on the comparator 88, as long as the vibration from the granulator 12 exceeds a predetermined threshold. When the vibration falls below this threshold, the comparator 102 turns off which also turns off the comparator 88 and deenergizes the relay 94. When this happens, the motor relay 30 (FIG. 2) is deenergized which turns off the motor 18 until the position transducer 40 is again moved.

Although the auxiliary motor control of the present invention has been described for use in conjunction with a granulator, it will be understood that it can be employed on different types of machines. Likewise, the addition of emergency cut off circuits, and the like will be well within the skill of one having ordinary skill in this particular field.

Likewise, although a movement transducer 40 may be used for detecting the introduction of parts into the granulator intake 14, any other conventional means can alternatively be used to detect the introduction of parts to the machine. For example, an infrared motion detector can be used.

With reference now to FIG. 4, the device of the present invention can also operate in a semi-automatic mode in which the motor 18 is energized for a preset time period following each introduction of parts into the intake 14. Furthermore, the time of energization of the motor 18 is cumulative for each introduction of parts into the intake 14.

In the semi-automatic mode, a switch 120 is opened which disables the comparator 102. Simultaneously, a switch 122 is closed which electrically connects a capacitor 124 in parallel with the capacitor 90. Furthermore, the capacitor 124 has a larger capacitive valve than the capcitor 90.

In operation, each time the transducer 40 provides an output signal, a pulse is provided to the capacitors 90 and 124 thus charging these capacitors. The capacitors 90 and 124, when charged, provide a voltage signal to line 89 which maintains the activation of the motor 18 in the previously described fashion until the capacitors 90 and 124 discharge.

Having described my invention, however, many modifications thereto will become apparent to those having ordinary skill in the art to which it pertains without deviation from the spirit of the invention as defined by the scope of the appended claims.

I claim:

1. For use in conjunction with a machine having an intake adapted to receive parts to be machined and a motor which, upon activation, performs a machining operation on the parts introduced into the intake, a device for controlling activation of said motor comprising:

means for detecting the introduction of parts into the machine intake and for generating an output signal, means responsive to said detecting means output signal for activating said motor, means for sensing the presence of a machining operation and for generating an output signal representative thereof, means for maintaining activation of said motor as long as said sensing means output signal exceeds a predetermined threshold value, and means for deactivating said motor whenever said sensing means output signal falls below said threshold value for greater than a predetermined period of time, wherein said sensing means comprises means for sensing vibration of the machine.

2. The invention as defined in claim 1 wherein said machine is a granulator.

3. The invention as defined in claim 1 wherein said detecting means comprises a lever disposed in said intake, said lever being arranged so that the introduction of parts into said intake moves said lever, and a position transducer attached to said lever.

4. The invention as defined in claim 3 wherein said machine comprises a flap disposed across said intake and wherein said lever is attached to said flap.

5. The invention as defined in claim 3 wherein said lever is movable between a first and a second limit, and wherein said detecting means output signal is generated upon movement of said lever greater than a predetermined amount from a plurality of at rest positions of said lever between said limits.

6. The invention as defined in claim 3 wherein said lever is movable between a first and a second limit, and wherein said detecting means output signal is generated upon movement of said lever greater than a predetermined amount from any at rest positions of said lever between said limits.

7. The invention as defined in claim 6 wherein said position transducer provides an output signal proportional to the position of said lever between said first and second limits, and comprising:

circuit means for establishing an upper voltage limit and a lower voltage limit as a function of an at rest position of said lever for greater than a predetermined time period, said transducer providing said output signal between said upper and lower voltage limits, said transducer output signal is an instantaneous voltage signal representative of the instantaneous position of said lever, wherein said detecting means output signal is generated whenever said instantaneous voltage signal exceeds said upper voltage limit or falls below said lower voltage limit.

8. The invention as defined in claim 1 further comprising emergency switch means for deactivating said motor upon activation of said emergency switch means.

9. The invention as defined in claim 1 wherein said activating means activates

10. For use in conjunction with a machine having an intake adapted to receive parts to be machined and a motor which, upon activation, performs a machining operation on the parts introduced into the intake, a device for controlling activation of said motor comprising:

means for detecting the introduction of parts into the machine intake and for generating an output signal, means responsive to said detecting means output signal for activating said motor, means for sensing the presence of a machining operation and for generating an output signal representative thereof, means responsive to the absence of the sensing means output signal for a predetermined period of time for deactivating said motor, wherein said detecting means comprises a lever disposed in said intake, said lever being arranged so that the introduction of parts into said intake moves said lever, and a position transducer attached to said lever, wherein said machine comprises a flap disposed across said intake and wherein said lever is attached to said flap.

11. The invention as defined in claim 10 wherein said lever is movable between a first and a second limit, and wherein said detecting means output signal is generated upon movement of said lever greater than a predetermined amount from a plurality of at rest positions of said lever between said limits.

12. The invention as defined in claim 10 wherein said lever is movable between a first and a second limit, and wherein said detecting means output signal is generated upon movement of said lever greater than a predetermined amount from any at rest positions of said lever between said limits.

13. For use in conjunction with a machine having an intake adapted to receive parts to be machined and a motor which, upon activation, performs a machining operation on the parts introduced into the intake, a device for controlling activation of said motor comprising:

means for detecting the introduction of parts into the machine intake and for generating an output signal, means responsive to said detecting means output signal for activating said motor, means for sensing the presence of a machining operation and for generating an output signal representative thereof, and means responsive to the absence of the sensing means output signal for a predetermined period of time for deactivating said motor, wherein said detecting means comprises a lever disposed in said intake, said lever being arranged so that the introduction of the parts into said intake moves said lever, and a position transducer attached to said lever, wherein said lever is movable between a first and a second limit, and wherein said detecting means output signal is generated upon movement of said lever greater than a predetermined amount from any at rest positions of said lever between said limits, wherein said position transducer provides an output signal proportional to the position of said lever between said first and second limits, and comprising:

circuit means for establishing an upper voltage limit and a lower voltage limit as a function of an at rest position of said lever for greater than a predetermined time period, said transducer providing said output signal between said upper and lower voltage limits, said transducer output signal is an instantaneous voltage signal representative of the instantaneous position of said lever, wherein said detecting means output signal is generated whenever said instantaneous voltage signal exceeds said upper voltage limit or falls below said lower voltage limit.

* * * * *